(12) United States Patent
Goldfarb

(10) Patent No.: US 8,990,238 B2
(45) Date of Patent: Mar. 24, 2015

(54) SYSTEM AND METHOD FOR KEYWORD SPOTTING USING MULTIPLE CHARACTER ENCODING SCHEMES

(75) Inventor: Eithan Goldfarb, Ness Ziona (IL)

(73) Assignee: Verint Systems Ltd., Herzelia, Pituach (IL)

( * ) Notice: Subject to any disclaimer, the term of this patent is extended or adjusted under 35 U.S.C. 154(b) by 117 days.

(21) Appl. No.: 13/457,373

(22) Filed: Apr. 26, 2012

(65) Prior Publication Data

US 2012/0303648 A1 Nov. 29, 2012

(51) Int. Cl.
*G06F 17/30* (2006.01)
*G06F 7/00* (2006.01)
*G06F 17/22* (2006.01)
*G06F 17/27* (2006.01)

(52) U.S. Cl.
CPC ........ *G06F 17/2217* (2013.01); *G06F 17/2775* (2013.01)
USPC ............................ 707/760; 707/706; 707/722

(58) Field of Classification Search
None
See application file for complete search history.

(56) References Cited

U.S. PATENT DOCUMENTS

| | | | |
|---|---|---|---|
| 5,689,442 A | 11/1997 | Swanson et al. | |
| 6,404,857 B1 | 6/2002 | Blair et al. | |
| 6,718,023 B1 | 4/2004 | Zolotov | |
| 6,757,361 B2 | 6/2004 | Blair et al. | |
| 7,216,162 B2 | 5/2007 | Amit et al. | |
| 7,308,446 B1 | 12/2007 | Panigrahy | |
| 7,466,816 B2 | 12/2008 | Blair | |
| RE40,634 E | 2/2009 | Blair et al. | |
| 7,587,041 B2 | 9/2009 | Blair | |
| 8,447,588 B2 * | 5/2013 | Karttunen | 704/9 |
| 2005/0251512 A1 * | 11/2005 | McCauley et al. | 707/3 |
| 2006/0259462 A1 * | 11/2006 | Timmons | 707/3 |
| 2007/0185859 A1 * | 8/2007 | Flowers et al. | 707/5 |
| 2007/0239741 A1 * | 10/2007 | Jordahl | 707/100 |
| 2007/0261112 A1 * | 11/2007 | Todd et al. | 726/11 |
| 2008/0014873 A1 | 1/2008 | Krayer et al. | |
| 2008/0261192 A1 | 10/2008 | Huang et al. | |

(Continued)

FOREIGN PATENT DOCUMENTS

| | | | | |
|---|---|---|---|---|
| EP | 0989499 A2 | | 3/2000 | |
| EP | 000989499 A2 * | | 3/2000 | ............ G06F 17/21 |

(Continued)

OTHER PUBLICATIONS

Extended European Search Report, dated Dec. 12, 2012, received from the European Patent Office in connection with European Application No. 12165926.2.

(Continued)

*Primary Examiner* — Dung K Chau
(74) *Attorney, Agent, or Firm* — Meunier Carlin & Curfman

(57) ABSTRACT

Methods and systems for finding search phrases in a body of data that is encoded using any of multiple possible character encoding schemes. An analytics system accepts an input search phrase for searching in a certain body of data. The system identifies two or more candidate character encoding schemes, which may have been used for encoding the body of data. Having determined the candidate encoding schemes, the system translates the input search phrase into multiple encoding-specific search phrases that represent the input search phrase in the respective candidate encoding schemes. The system then searches the body of data for occurrences of the input search phrase using the multiple encoding-specific search phrases.

16 Claims, 1 Drawing Sheet

(56) References Cited

U.S. PATENT DOCUMENTS

| | | | |
|---|---|---|---|
| 2008/0285464 A1 | 11/2008 | Katzir | |
| 2009/0019019 A1* | 1/2009 | Jones et al. | 707/4 |
| 2009/0171936 A1* | 7/2009 | Kirk et al. | 707/5 |
| 2010/0250497 A1* | 9/2010 | Redlich et al. | 707/661 |
| 2012/0030195 A1* | 2/2012 | Holt et al. | 707/722 |
| 2012/0066312 A1* | 3/2012 | Kandekar et al. | 709/205 |
| 2012/0109923 A1* | 5/2012 | Pasquero et al. | 707/706 |
| 2012/0193424 A1* | 8/2012 | Al-Omari et al. | 235/462.1 |
| 2012/0233215 A1* | 9/2012 | Walker | 707/777 |

FOREIGN PATENT DOCUMENTS

| | | |
|---|---|---|
| EP | 2104044 A1 | 9/2009 |
| EP | 2287756 A1 | 2/2011 |

OTHER PUBLICATIONS

Liu, Rong-Tai, et al., "A Fast Pattern-Match Engine for Network Processor-based NIDS," Proceedings of the 20th International Conference on Information Technology (ITCC'04), Dec. 5, 2006, 23 pages.

Rohde & Schwarz GmbH & Co. KG, "Accessnet-T, DMX-500 R2, Digital Mobile eXchange," Product Brochure, Secure Communications, Mar. 2000, 4 pages.

Rohde & Schwarz GmbH & Co. KG, "Accessnet-T IP," Product Brochure, Secure Communications, Jan. 2000, 4 pages.

Rohde & Schwarz GmbH & Co. KG, "R&S AllAudio Integrierte digitale Audio-Software," Product Brochure, Feb. 2002, 12 pages.

Rohde & Schwarz GmbH & Co. KG, "R&S AllAudio Integrated Digital Audio Software," Product Brochure, Radiomonitoring & Radiolocation, Feb. 2000, 12 pages.

Rohde & Schwarz GmbH & Co. KG, "The R&S AMMOS GX430 PC-Based Signal Analysis and Signal Processing Standalone software solution," http://www2.rohde-schwarz.com/en/products/radiomonitoring/Signal_Analysis/GX430, Jul. 30, 2010, 1 page.

Rohde & Schwarz GmbH & Co. KG, "R&S AMMOS GX425 Software," http://www2.rohde-schwarz.com/en/products/radiomonitoring/Signal_Analysis/GX425, Jul. 30, 2010, 1 page.

Rohde & Schwarz GmbH & Co. KG, "R&S Ramon COMINT/CESM Software," Product Brochure, Radiomonitoring & Radiolocation, Jan. 2000, 22 pages.

Rohde & Schwarz GmbH & Co. KG, "R&S TMSR200 Lightweight Interception and Direction Finding System," Technical Information, Aug. 14, 2009, 8SPM-ko/hn, Version 3.0, 10 pages.

Rohde & Schwarz GmbH & Co. KG, "Digital Standards for R&S SMU200A, R&S SMATE200A, R&S SMJ100A, R&S SMBV100A and R&S AMU200A," Data Sheet, Test & Measurement, May 2000, 68 pages.

Rohde & Schwarz GmbH & Co. KG, "R&S RA-CM Continuous Monitoring Software," Product Brochure, Radiomonitoring & Radiolocation, Jan. 2001, 16 pages.

Rohde & Schwarz GmbH & Co. KG, "Integrated Digital Audio Software R&S AllAudio," Specifications, 8 pages.

Metronome SSL Inspector Solution Overview White Paper, "Examining SSL-encrypted Communications," 2010, 8 pages.

Dharmapurikar, Sarang, et al., "Fast and Scalable Pattern Matching for Network Intrusion Detection Systems," IEEE Journal on Selected Areas in Communications, Oct. 2006, vol. 24, Issue 10, pp. 1781-1792.

Fisk, Mike, et al., "Applying Fast String Matching to Intrusion Detection," Los Alamos National Laboratory and University of California San Diego, 22 pages.

Fox Replay BV, "FoxReplay Analyst," http//www.foxreplay.com, Revision 1.0, Nov. 2007, 5 pages.

Fox-IT BV, "FoxReplay Analyst," Product Brochure, http//www.foxreplay.com, 2 pages.

Aho, Alfred V., et al., "Efficient String Matching: An Aid to Bibliographic Search," Communication of the ACM, Jun. 1975, vol. 18, No. 6, pp. 333-340.

Coffman, T., et al., "Graph-Based Technologies for Intelligence Analysis," CACM, Mar. 2004, 12 pages.

Cloudshield, Inc., "Lawful Intercept Next-Generation Platform," 2009, 6 pages.

Goldfarb, Eithan, "Mass Link Analysis: Conceptual Analysis," 2006, Version 1.1, 21 pages.

Verint Systems Inc., "Mass Link Analysis: Solution Description," Dec. 2008, 16 pages.

High-Performance LI with Deep Packet Inspection on Commodity Hardware, ISS World, Singapore, Jun. 9-11, 2008, Presenter: Klaus Mochalski, CEO, ipoque, 25 pages.

Pan, Long, "Effective and Efficient Methodologies for Social Network Analysis," Dissertation submitted to faculty of Virginia Polytechnic Institute and State University, Blacksburg, Virginia, Dec. 11, 2007, 148 pages.

Schulzrinne, H., et al., "RTP: A Transport Protocol for Real-Time Applications," Standards Track, Jul. 2003, 89 pages.

Sheng, Lei, "A Graph Query Language and Its Query Processing," IEEE, Apr. 1999, pp. 572-581.

Soghoian, Christopher, et al., "Certified Lies: Detecting and Defeating Government Interception Attacks Against SSL," 19 pages.

Svenson, Pontus, "Social network analysis and information fusion for anti-terrorism," CIMI, 2006, 8 pages.

Tongaonkar, Alok S., "Fast Pattern-Matching Techniquest for Packet Filtering," Stony Brook University, May 2004, 44 pages.

Yu, Fang, et al., "Fast and Memory-Efficient Regular Expression Matching for Deep Packet Inspection," ANCS'06, Dec. 3-5, 2006, San Jose, California, 10 pages.

Yu, Fang, et al., "Gigabit Rate Packet Pattern-Matching Usint TCAM," Proceedings of the 12th IEEE International Conference on Network Protocols (ICNP'04) 10 pages.

* cited by examiner

SYSTEM AND METHOD FOR KEYWORD SPOTTING USING MULTIPLE CHARACTER ENCODING SCHEMES

FIELD OF THE DISCLOSURE

The present disclosure relates generally to data processing, and particularly to methods and systems for identifying phrases in data.

BACKGROUND OF THE DISCLOSURE

Keyword searching techniques are used in a wide variety of applications. For example, in some applications, communication traffic is analyzed in an attempt to detect keywords that indicate traffic of interest. Some data security systems attempt to detect information that leaks from an organization network by detecting keywords in outgoing traffic. Intrusion detection systems sometimes identify illegitimate intrusion attempts by detecting keywords in traffic. Forensic analysis tools sometimes analyze disk content using keyword search for obtaining evidence.

SUMMARY OF THE DISCLOSURE

An embodiment that is described herein provides a method including accepting an input search phrase to be located in a body of data. Multiple candidate character encoding schemes are identified using one or more characteristics of the input search phrase. The input search phrase is translated into multiple encoding-specific search phrases, each encoding-specific search phrase representing the input search phrase in a different, respective candidate character encoding scheme. One or more occurrences of the input search phrase are identified in the body of data by searching the body of data using each of the multiple encoding-specific search phrases.

In some embodiments, the input search phrase includes at least one wildcard operator, and translating the input search phrase includes representing the wildcard operator in each of the encoding-specific search phrases using a respective encoding-specific wildcard operator that is equivalent to the wildcard operator in the respective candidate character encoding scheme. In an embodiment, the body of data includes network traffic that is received from a communication network. In a disclosed embodiment, identifying the candidate character encoding schemes includes identifying a language in which the input search phrase or the body of data is written, and selecting the candidate character encoding schemes based on the identified language.

In another embodiment, translating the input search phrase includes producing at least one encoding-specific search phrase that matches left-to-right text and at least one other encoding-specific search phrase that matches right-to-left text. In yet another embodiment, the method includes reporting the identified occurrences of the input search phrase to an operator.

In some embodiments, identifying the one or more occurrences of the input search phrase includes searching the body of data using only a partial subset of the candidate character encoding schemes, selected based on a characteristic of the body of data. In a disclosed embodiment, the method includes selecting the partial subset based on one or more escape sequences found in the body of data.

There is additionally provided, in accordance with an embodiment that is described herein, apparatus including an interface and a processor. The interface is configured to accept an input search phrase to be located in a body of data. The processor is configured to identify multiple candidate character encoding schemes using one or more characteristics of the input search phrase, to translate the input search phrase into multiple encoding-specific search phrases, each encoding-specific search phrase representing the input search phrase in a different, respective candidate character encoding scheme, and to identify one or more occurrences of the input search phrase in the body of data by searching the body of data using each of the multiple encoding-specific search phrases.

BRIEF DESCRIPTION OF THE DRAWINGS

The present disclosure will be more fully understood from the following detailed description of the embodiments thereof, taken together with the drawings in which.

DETAILED DESCRIPTION OF EMBODIMENTS

Overview

Data that is subject to searching, such as data that is conveyed in network traffic, may be represented using various character encoding schemes. Character encoding schemes may comprise, for example, American Standard Code for Information Interchange (ASCII) encoding, Unicode schemes such as Unicode Transformation Format-8 (UTF-8) or UTF-16, Extended Binary Coded Decimal Interchange Code (EBCDIC), and many others. Some types of data, such as Chinese text, can be represented using any of several tens of encoding schemes. When searching for a keyword or phrase in a body of data, in some cases there is no a-priori information as to which encoding scheme was used for encoding the data.

Embodiments that are described herein provide improved search techniques, which find search phrases in a body of data that is encoded using any of multiple possible character encoding schemes. In some embodiments, an analytics system accepts an input search phrase for searching in a certain body of data. The system identifies two or more candidate character encoding schemes, which may have been used for encoding the body of data. For example, the system may identify the language in which the body of data or the input search phrase is written, and select two or more encoding schemes that are known to be used in that language.

Having determined the candidate encoding schemes, the system translates the input search phrase into multiple encoding-specific search phrases that represent the input search phrase in the respective candidate encoding schemes. In particular, the disclosed techniques translate wildcard operators in the input search phrase into equivalent wildcard operators in the candidate encoding schemes. The system then searches the body of data for occurrences of the input search phrase using the multiple encoding-specific search phrases.

Since the input search phrase is translated into the encoding-specific search phrases as a preparatory step, the subsequent multiple-encoding search process is fast and efficient. As such, the disclosed techniques are particularly suitable for real-time or other time-constrained search applications, and for searching over a large volume of data. Although it is possible in principle to handle multiple encoding schemes by converting the body of data, and not the search phrase, into a certain baseline encoding scheme before searching, this solution is highly inefficient, especially in real-time applications and/or when searching over a large volume of data.

System Description

Figure 1:
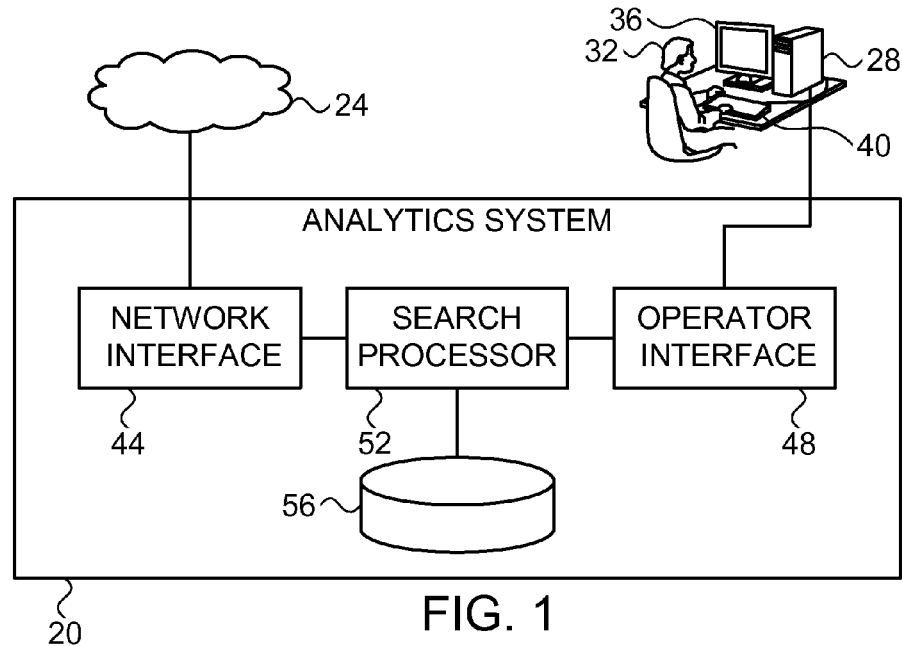
FIG. 1 is a block diagram that schematically illustrates an analytics system, in accordance with an embodiment that is described herein.

FIG. 1 is a block diagram that schematically illustrates an analytics system 20, in accordance with an embodiment that is described herein. As will be explained in detail below, system 20 searches for occurrences of input search phrases in a body of data, e.g., in network traffic. System 20 can be used, for example, in an application that detects data leakage from a communication network. In applications of this sort, the presence of one or more search phrases in a data item indicates that this data item should not be allowed to exit the network. As another example, system 20 can be used in a communication intelligence analysis application, which intercepts and analyzes traffic of interest. In this sort of application, the presence of one or more search phrases in a data item (e.g., a communication packet) indicates that the packet may be of interest.

Additionally or alternatively, system 20 can be used in any other suitable application in which a body of data is searched for occurrences of search phrases, such as in intrusion detection and prevention systems, detection of spam in electronic mail (e-mail) systems, or detection of inappropriate content using a dictionary of inappropriate words or phrases. Although the embodiments described herein refer mainly to processing of communication traffic, the disclosed techniques can also be used in other domains. For example, system 20 can be used for locating data of interest on storage devices, such as in forensic disk scanning applications.

In the present example, system 20 is connected to a data network 24, typically an Internet Protocol (IP) network. Network 24 may comprise, for example, the Internet or other Wide-Area Network, a Local-Area Network (LAN) of a certain organization, or any other suitable network. System 20 receives network traffic (typically communication packets or parts of packets) from network 24, and searches the packets for occurrences of certain specified search phrases. The communication traffic to be searched by system 20 may be provided to the system using any suitable means. For example, the traffic may be forwarded to the system from a network element (e.g., router) in network 24, such as by port tapping or port mirroring. In alternative embodiments, system 20 may be placed in-line in the traffic path. These embodiments suitable, for example, for data leakage prevention applications, but can also be used in other applications.

System 20 accepts input search phrases for searching from an operator terminal 28, and outputs search results to the operator terminal. Terminal 28 is operated by an operator 32, e.g., an analyst or network administrator. Operator 32 typically operates terminal 28 using a display 36 or other output devices, and a keyboard 40 or other input devices, for example in order to enter search phrases and view search results.

System 20 comprises a network interface 44 for accepting network traffic from network 24, an operator interface 48 for communicating with operator terminal 28, and a search processor 52 that carries out the search techniques described herein. In some embodiments, system comprises a storage device 56, e.g., for storing network traffic accepted from network 24, for storing search phrases and search results, or for any other suitable purpose.

Upon detecting a given search phrase in the inspected network traffic, processor 52 reports the detection to terminal 28. For example, processor 52 may issue an alert to the operator and/or present the data item (e.g., packet or session) in which the phrase was detected. In some embodiments, processor 52 may take various kinds of actions in response to detecting search phrases. For example, in a data leakage or intrusion prevention application, processor 52 may block some or all of the traffic upon detecting a search phrase.

System 20 may conduct searches in real-time or off-line. In a typical real-time process, processor 52 searches for search phrases in traffic as the traffic is received from network 24 via interface 44. In a typical off-line process, processor 52 searches for search phrases in traffic (or in data that has been extracted from traffic) that was received previously and is currently stored in storage device 56.

The system configuration shown in FIG. 1 is an example configuration, which is chosen purely for the sake of conceptual clarity. In alternative embodiments, any other suitable system configuration can be used. Generally, the different elements of system 20 may be carried out using software, hardware or a combination of hardware and software elements. In some embodiments, search processor 52 comprises a general-purpose computer, which is programmed in software to carry out the functions described herein. The software may be downloaded to the computer in electronic form, over a network, for example, or it may, alternatively or additionally, be provided and/or stored on non-transitory tangible media, such as magnetic, optical, or electronic memory.

In other embodiments, search processor 52 may comprise, or may be assisted by, a regular expression accelerator device. A device of this sort may comprise, for example, the NLS2008 device produced by NetLogic Microsystems, Inc. (Santa Clara, Calif.), the NITROX devices produced by Cavium Networks, Inc. (Mountain View, Calif.), or any other suitable device. Alternatively, search processor 52 may comprise, or may be assisted by, a network processor such as devices produced by Freescale Semiconductor, Inc. (Austin, Tex.), Ternary Content Addressable Memory (TCAM)-based pattern matching hardware, or any other suitable circuitry.

Searching with Multiple Character Encoding Schemes

The data that is conveyed by network traffic may be encoded using various character encoding schemes (also referred to herein as "encoding schemes" for brevity). The term "character encoding scheme" refers to a mapping of characters to respective numerical values, which is used for producing the data. Example character encoding schemes are ASCII, Unicode schemes such as UTF-8, UTF-16 and UTF-32 and EBCDIC. In some encoding schemes, each character is represented using a single byte, i.e., an eight-bit value. In other encoding schemes, characters may be represented using sixteen-bit values, or using any other suitable numerical representation. As will be described in detail below, some encoding schemes may reverse the order of characters.

In many practical cases, system 20 has no a-priori information regarding which encoding scheme will be used for encoding a given body of data. In order to find search phrases in the data, however, the search process should take the encoding scheme into account. (In some cases system 20 may identify the encoding that is used during the processing of a given datagram, such as when the encoding scheme is identified by an Escape Sequence. Escape sequences for various encoding schemes are specified, for example, by the International Organization for Standardization (ISO) in "Information Technology—Character Code Structure and Extension Techniques," ISO/IEC 2022:1994, which is incorporated herein by reference. In other cases there is no explicit identification of the character set being used.)

In some embodiments, processor 52 of system 20 handles situations of this sort by identifying two or more candidate encoding schemes, which are suspected of having been used to encode the data. Processor 52 translates the input search phrase into two or more encoding-specific search phrases, which are equivalent to the input search phrase in the respective candidate encoding schemes. Processor 52 then searches the data jointly using the encoding-specific search phrases. Finding an occurrence of a certain encoding-specific search phrase in the data is indicative, with high likelihood, of a match for the input search phrase.

For example, some encoding schemes may correspond to left-to-right text direction (as in English text) while other encoding schemes may correspond to right-to-left text direction (as in Hebrew or Arabic text). Thus, in some embodiments, processor 52 produces both left-to-right and right-to-left encoding-specific search phrases in order to find matches in both left-to-right and right-to-left data. (In some cases, e.g., due to multi-byte encodings, the left-to-right and right-to-left encoding-specific search phrases may not always be exact mirror images of one another.)

Consider, for example, a scenario in which the input search phrase is the Hebrew word "ישראל" and the candidate encoding schemes are UTF-16 and ISO-IR/234. The encoding-specific search phrases produced by processor 52 are (all in Hexadecimal representation) "05 D9 05 E9 05 E8 05 D0 05 DC" (UTF-16) and "69 79 78 60 6C" (ISO-IR/234). In both cases the order of characters may be reversed in HTML and XMLs and in various files (such as in PDFs). In that case, the UTF-16 search phrase will be "05 DC 05 D0 05 E8 05 E9 05 D9".

System 20 may support any suitable number and types of character encoding schemes. Some encoding schemes may correspond to certain languages. For example, Chinese text may be encoded using any of several possible encoding schemes such as Unicode, Big5, GB18030 and Goubiao, among others. The Chinese (Ding) character, for example, is represented as "4E 01" in Unicode and "B6 A1" in Guobiao.

In some embodiments, the input search phrase specified by operator 32 contains one or more wildcard operators. The term "wildcard operator" refers to a predefined sequence of one or more characters in the search phrase that permit multiple possible matches. In other words, a given wildcard operator corresponds to a predefined set of characters or character sequences that, if substituted for the wildcard operator, are regarded as a successful match. Example wildcard operators are a wildcard that can be zero or more characters. Other wildcard operators may specify specific ranges of characters, e.g., lowercase or uppercase characters.

Typically, operator 32 enters the input search phrases regardless of the character encoding scheme that may encode the data. In some embodiments the input search phrases are entered at a format that is suitable for one character encoding scheme (e.g., Unicode), even though the data may be encoded with a different encoding scheme. Wildcard operators, however, may have different formats in different encoding schemes. For example, a wildcard operator for a single character should be replaced by a single byte in ASCII, by a fixed two-byte sequence in UTF-16 and by a variable length sequence in UTF-8.

In some embodiments, when translating an input search phrase into the encoding-specific search phrases, processor 52 converts each wildcard operator in the input search phrase into equivalent encoding-specific wildcard operators according to the candidate encoding schemes. In some cases, a certain wildcard operator may be represented by a single character in one encoding scheme, and by a two-character sequence in another encoding scheme. Thus, the equivalent encoding-specific wildcards in different encoding schemes may be of different lengths. Processor 52 may convert the wildcard operators using any suitable technique, such as using a table that gives the wildcard formats in different encoding schemes.

In some embodiments, system 20 supports a large number of character encoding schemes. Searching a large data volume using such a large number of encoding-specific search phrases may be slow and computationally intensive. Thus, in some embodiments processor 52 initially narrows down the number of candidate encoding schemes to a small subset of the supported schemes, such as two or three candidate schemes. The search processor then produces encoding-specific search phrases and performs the subsequent search using only the selected subset of candidate encoding schemes.

Processor 52 may choose the candidate encoding schemes in any suitable way. In some embodiments, the processor selects the candidate schemes based on characteristics of the input search phrase. In other embodiments, the processor selects the candidate schemes based on characteristics of the body of data. For example, if processor 52 identifies that the input search phrase is an English word, it can narrow down the candidate encoding schemes to schemes that are common for representing English text. As another example, if processor 52 identifies an Escape Sequence identifying the character set that is used, it may narrow the searches to this specific encoding. Alternatively, processor 52 may use any other suitable characteristic of the input search phrase and/or data for choosing the candidate encoding schemes.

Figure 2:
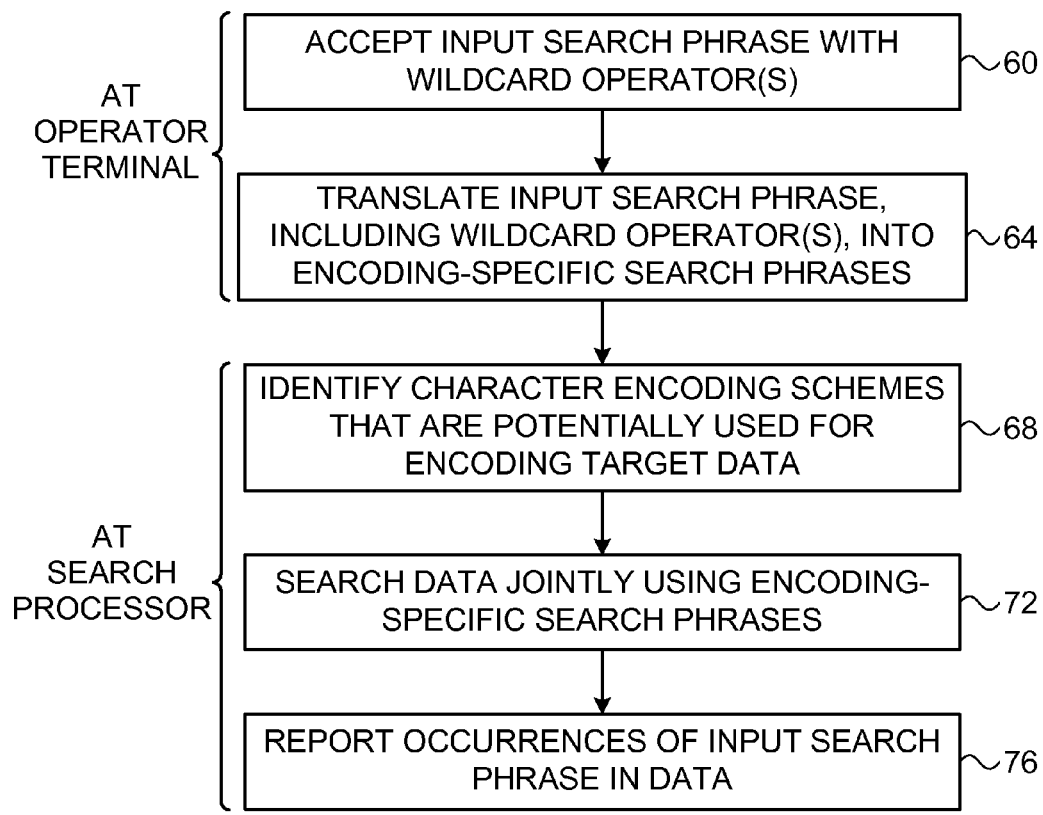
FIG. 2 is a flow chart that schematically illustrates a method for locating search phrases in target data, in accordance with an embodiment that is described herein.

FIG. 2 is a flow chart that schematically illustrates a method for locating search phrases in target data, in accordance with an embodiment that is described herein. Although the present example refers to a single input search phrase, system 20 typically searches a given body of data for multiple input search phrases concurrently. Any suitable body of data can be searched, such as a particular traffic flow, a set of traffic flows (e.g., the flows associated with one or more target users), or even all network traffic.

In the present example, the process is divided into two sub-processes, one performed by operator terminal 28 and the other performed by search processor 52. The operator terminal in this embodiment runs software that accepts an input search phrase from operator 32, and converts it into equivalent encoding-specific search phrases in multiple different encoding schemes, including left-to-right and right-to-left schemes if applicable. Search processor 52 searches the data jointly using the multiple encoding-specific search phrases. The search engine may narrow down the set of encoding schemes to a small number of candidate schemes based on analysis data.

In this context, operator terminal 28 and search processor 52 can be viewed collectively as a processor that carries out the method of FIG. 2. In alternative embodiments, the process can be divided between terminal 28 and processor 52 in any other desired manner, or even be executed exclusively by processor 52.

The method begins with operator terminal 28 accepting an input search phrase from operator 32 via interface 48, at an input step 60. The input search phrase may comprise one or more words, or any other suitable combination of characters. In the present example, the input search phrase contains at least one wildcard operator.

Terminal 28 translates the input search phrase into multiple encoding-specific search phrases, at a phrase translation step 64. Each encoding-specific search phrase represents the input search phrase in a respective candidate encoding scheme. In particular, terminal 28 converts the wildcard operator in the input search phrase into equivalent encoding-specific wildcard operators in the encoding-specific search phrases. The encoding-specific search phrases are provided to search processor 52.

In some embodiments, search processor 52 narrows down the set of possible encoding schemes for searching, i.e., identifies two or more candidate encoding schemes that are potentially used for encoding the data in question, at a candidate scheme identification step 68. As explained above, processor 52 may (during traffic analysis) narrow down the possible encoding schemes to a relatively small number of candidate schemes, e.g., by identifying the language of the input search phrase or of the body of data, escape sequences, protocols, session related information, or other information.

Processor 52 then searches the body of data jointly using the encoding-specific search phrases of the candidate schemes, at a searching step 72. In other words, processor 52 attempts to find a match in the data for any of the encoding-specific search phrases. Upon finding one or more matches, system 20 reports the matches to operator terminal 28, at a result reporting step 76.

Although the embodiments described herein mainly address searching in network traffic, the principles of the present disclosure can also be used for searching in other suitable media, such as for searching files in disk drives during forensic analysis.

It will thus be appreciated that the embodiments described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art.

The invention claimed is:

1. A method, comprising:
accepting an input search phrase to be located in a body of data;
identifying multiple candidate character encoding schemes using one or more characteristics of the input search phrase;
translating the input search phrase into multiple encoding-specific search phrases, each encoding-specific search phrase representing the input search phrase in a different, respective candidate character encoding scheme; and
identifying one or more occurrences of the input search phrase in the body of data by searching the body of data using each of the multiple encoding-specific search phrases.

2. The method according to claim 1, wherein the input search phrase comprises at least one wildcard operator, and wherein translating the input search phrase comprises representing the wildcard operator in each of the encoding-specific search phrases using a respective encoding-specific wildcard operator that is equivalent to the wildcard operator in the respective candidate character encoding scheme.

3. The method according to claim 1, wherein the body of data comprises network traffic that is received from a communication network.

4. The method according to claim 1, wherein the identifying multiple candidate character encoding schemes comprises identifying a language in which the input search phrase or the body of data is written, and selecting the candidate character encoding schemes based on the identified language.

5. The method according to claim 1, wherein the translating input search phrase comprises producing at least one encoding-specific search phrase that matches left-to-right text and at least one other encoding-specific search phrase that matches right-to-left text.

6. The method according to claim 1, further comprising reporting the identified occurrences of the input search phrase to an operator.

7. The method according to claim 1, wherein the identifying one or more occurrences of the input search phrase comprises searching the body of data using only a partial subset of the candidate character encoding schemes, selected based on a characteristic of the body of data.

8. The method according to claim 7, further comprising selecting the partial subset based on one or more escape sequences found in the body of data.

9. Apparatus, comprising:
an interface, which is configured to accept an input search phrase to be located in a body of data; and
a processor, which is configured to identify multiple candidate character encoding schemes using one or more characteristics of the input search phrase, to translate the input search phrase into multiple encoding-specific search phrases, each encoding-specific search phrase representing the input search phrase in a different, respective candidate character encoding scheme, and to identify one or more occurrences of the input search phrase in the body of data by searching the body of data using each of the multiple encoding-specific search phrases.

10. The apparatus according to claim 9, wherein the input search phrase comprises at least one wildcard operator, and wherein the processor is configured to represent the wildcard operator in each of the encoding-specific search phrases using a respective encoding-specific wildcard operator that is equivalent to the wildcard operator in the respective candidate character encoding scheme.

11. The apparatus according to claim 9, wherein the body of data comprises network traffic that is received from a communication network.

12. The apparatus according to claim 9, wherein the processor is configured to identify a language in which the input search phrase or the body of data is written, and to select the candidate character encoding schemes based on the identified language.

13. The apparatus according to claim 9, wherein the processor is configured to produce at least one encoding-specific search phrase that matches left-to-right text and at least one other encoding-specific search phrase that matches right-to-left text.

14. The apparatus according to claim 9, wherein the processor is configured to report the identified occurrences of the input search phrase to an operator.

15. The apparatus according to claim 9, wherein the processor is configured to search the body of data using only a partial subset of the candidate character encoding schemes, selected based on a characteristic of the body of data.

16. The apparatus according to claim 15, wherein the processor is configured to select the partial subset based on one or more escape sequences found in the body of data.

* * * * *